Nov. 29, 1960  V. C. SMITH  2,962,438
ION EXCHANGE PROCESS FOR WATER PURIFICATION
Filed April 7, 1955
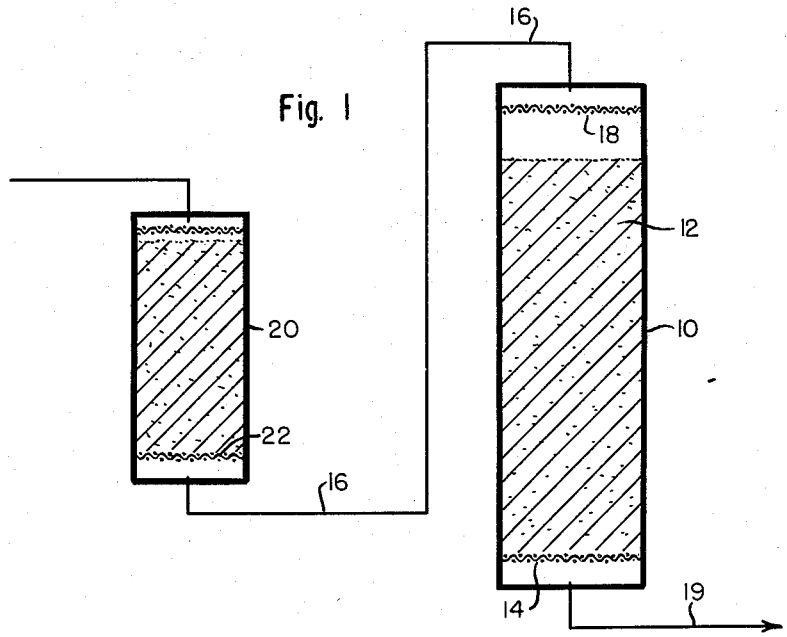
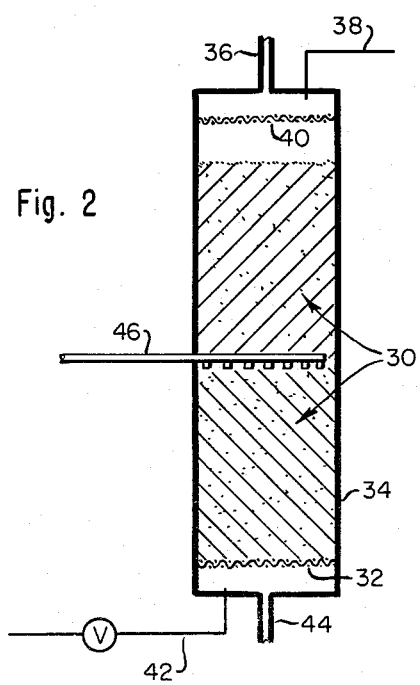
*INVENTOR.*
VERITY C. SMITH
BY
ATTORNEYS

2,962,438

ION EXCHANGE PROCESS FOR WATER PURIFICATION

Verity C. Smith, West Roxbury, Mass., assignor to Barnstead Still and Sterilizer Co., Boston, Mass., a corporation of Massachusetts Filed Apr. 7, 1955, Ser. No. 499,786

6 Claims. (Cl. 210—37)

This invention is in the field of water purification, and relates particularly to the treatment of natural waters to produce pure water of distillation quality.

It is of course, well known that dissolved salts and other inorganic matter may be removed very effectively from water by contacting the water with cation- and anion-exchange resins. Frequently, however, water so treated, while being substantially entirely demineralized, does not have the extremely high resistivity of pure water, and is not suitable for applications requiring water of the highest attainable purity. It has been found for instance, that with some natural waters, ion-exchange demineralization alone is ineffective to bring the resistivity above $1 \times 10^6$ ohm-centimeters.

The present invention provides a water treatment by which the purity of the treated water is greatly increased and the resistivity raised several fold. The treatment consists in passing the water to be purified in contact with anion- and cation-exchange resins, and also in contact with a weakly basic porous acid adsorbing resin.

The acid adsorbing resins useful in this invention are well known in the art and are generally described by their manufacturers as being highly porous anion exchange resins of the acid adsorbing type and having a large active surface on which molecules are readily adsorbed. Commercially available resins of this type are those sold by Chemical Process Company of Redwood City, California and designated Duolite A–6 (believed to be a porous opaque phenol-formaldehyde condensation product having active tertiary amino groups), and Duolite A–7 (believed to be a porous opaque phenol formaldehyde condensation product having active primary secondary and tertiary amino groups). Resins of this general type are also described in U.S. Patent 2,615,924. These resins are typically opaque porous polymeric structures which present a large adsorbent surface and to which are bonded weakly basic ionic groups, generally primary secondary or tertiary amino groups. Although these resins are often referred to as anion-exchange resins, they are unlike the strongly basic anion-exchange resins generally having active quaternary ammonium or other highly dissociable cationic groups which render them able to enter metathetical reactions with salts, from which they have derived the designation "salt-splitting." The strongly basic resins are truly able to enter an exchange reaction, whereas the weakly basic resins, designated herein as acid adsorbing, are not capable of exchanging anions with salts. Their utility in demineralization arises from their ability to adsorb acids formed from dissolved salts by treatment with strongly acid cation-exchange resins in the hydrogen form.

In treating water in accordance with this invention the water is passed through one or more beds in contact with strongly acid cation-exchange resins and strongly basic anion exchange resin, and also in contact with the acid adsorbing resin. Markedly improved results are attained when the water is contacted with the acid adsorbing resin before or after demineralization with the anion and cation exchange resins, but best results are attained if the acid adsorbing resin is admixed in a single bed with the cation and anion exchange resins. Thus, in its preferred embodiment the invention utilizes a single bed in which are intimately admixed a strongly acid cation exchange resin (for instance, a sulfonated copolymer of styrene and divinylbenzene in the hydrogen form), a strongly basic anion-exchange resin (for instance, a quaternary ammonia salt of an aminated copolymer of styrene and dinvylbenzene) and a porous acid adsorbing resin such as Duolite A–7, and the water is treated by percolating it through the bed. After exhaustion the bed is regenerated in the usual manner, as by backwashing to separate the resins in accordance with their densities and treating the anion resin with a dilute solution of an alkali, such as NaOH, the cation resin with a dilute solution of an acid, such as $H_2SO_4$, and the acid adsorbing resin with a dilute solution of an alkali. The resins are then thoroughly rinsed with water and mixed together, as by blowing air through the bed to fluidize it. Satisfactory results are attained with the anion and cation exchange resins in stoichiometrically equivalent amounts and with the acid adsorbing resin present in an amount of between about $\frac{1}{10}$ and $\frac{1}{2}$ the weight of anion-exchange resin.

The invention is described in detail with reference to preferred embodiments selected for purposes of illustration in the examples presented below. Reference is made to the drawings in which:

Fig. 1 is a schematic diagram showing a system employing a preliminary bed of the organic adsorbent resin used in conjunction with a conventional mixed bed demineralizer, and Fig. 2 is a schematic diagram of a system utilizing a single mixed bed in which is admixed the organic adsorbent resin.

One suitable system for treating water according to this invention, as shown in Fig. 1, consists of a cylindrical vessel 10 containing a mixture of substantially equivalent amounts of anion exchange resin and cation exchange resin supported as a bed 12 on a foraminous plate 14 spaced from the bottom of the vessel. An inlet 16 enters the top of the vessel above a perforated distribution plate 18 by which the influent is showered over the bed 12, and an outlet 19 from which treated purified water may be collected drains from the bottom of the vessel. A preliminary treating tank 20 is situated in the influent line 16 and contains a bed of acid adsorbing resin supported on a foraminous plate 22 spaced from the bottom of the tank. The water to be treated is introduced at the top of the tank 20 to flow first in contact with the acid adsorbing resin, and is then flowed after draining from the tank 20 through the bed 12 of mixed anion- and cation-exchange resin.

In a typical operation Boston water with added salts to bring the total solids content to 11.17 grains/gal. (expressed in terms of equivalent $CaCO_3$) was passed through a unit in which the bed of mixed anion and cation-exchange resins consisted of:

Cation-exchange resin—National Aluminate HCR, a sulfonated cross-linked styrene resin, in the hydrogen form, sold by National Aluminate Corp.—0.2 cu. ft.
Anion Resin—National Aluminate SBR, a quaternary ammonium salt of an aminated cross-linked styrene resin, in the hydroxyl form, sold by National Aluminate Corp.—0.3 cu. ft.

and a preliminary bed consisting of 0.077 cu. ft. of Duolite A–6. For comparative purposes, the same water was passed through the mixed bed alone, without preliminary treatment by an acid adsorbing resin, by periodically bypassing the bed of acid adsorbing resin. In each run the resistance was measured after various volumes had been treated and the results are given in Table I below. It will be seen that by pretreating the water with the acid adsorbing resin, water of far greater resistivity is obtained, and in addition, more effluent treated water is obtained before the beds are exhausted.

Table I

| Total Vol. of Water Treated, gallons | Resistivity of effluent from mixed bed, ohm/cm. | |
|---|---|---|
| | Water pretreated with acid adsorbing resin | Water not pretreated |
| 35 | 2,350,000 | |
| 55 | | 1,330,000 |
| 69 | | 868,000 |
| 120 | 5,460,000 | |
| 124 | | 924,000 |
| 179 | | 924,000 |
| 208 | | 49,000 |
| 225 | 5,300,000 | |
| 252 | | 50,000 |

In the system shown in Fig. 2, the acid adsorbing resin is admixed with the mixed anion- and cation-exchange resin. The bed 30 is retained on a foraminous plate 32 in a vessel 34 to the top of which connects an inlet conduit 36 and a vent 38, each located above a perforated header plate 40. To the bottom of the vessel are connected an air inlet conduit 42 and a drain 44. An intermediate header 46 enters the vessel at about its center, and provides for the introduction of the regenerant solution for the denser of the resins. In a typical run the results consisted of a mixture of:

|  | Cu. ft. |
|---|---|
| Cation Resin:HCR, hydrogen form | 0.2 |
| Anion Resin:SBR, hydroxyl form | 0.3 |
| Acid adsorbing:Duolite A-6 | 0.077 |

The water was treated by introducing it through the inlet conduit 36 to the top of the bed and draining it from the bottom of the bed through drain 44. When the bed became exhausted, it was regenerated by first introducing water through the drain 44 to backwash the bed and separate the resins according to their densities. With the resins used, the HCR cation resin formed as the lower layer while the SBR anion resin and the A-6 adsorbent resin remained in admixture as the upper resin bed. Since both of these resins in the upper bed are regenerated with alkali solutions, their admixture was advantageous in permitting simultaneous regeneration of both resins.

In regenerating the resins, 7 gallons of a 5% by weight solution of NaOH was introduced through the inlet 36 and flowed over both beds and water was then introduced at the top of the bed to rinse the anion-exchange resin and organic adsorbent resin.

About 7 gallons of a 5% by weight solution of HCl was next introduced at the intermediate header 46 to regenerate the bed of cation-exchange resin, followed by rinse water to remove excess acid. The vessel was then drained of excess water to the level of the beds, and the beds were thoroughly mixed by fluidizing them with air introduced at inlet 42 and exhausted at vent 38.

In a typical operation the water is processed in the cyclical operation of exhausting the beds then regenerating them as outlined above. Best results were obtained when the beds were permitted to rest for 2–3 hours after regeneration and prior to the start of the next exhaustion phase.

The results of 3 runs are shown in Table II.

Table II

| Total Volume of Water Treated, gallons | Resistivity of Effluent Water, ohms/cm. | | |
|---|---|---|---|
| | Run 1 | Run 2 | Run 3 |
| 60.5 | | | 1,630,000 |
| 70 | 6,100,000 | | |
| 86 | | 2,720,000 | |
| 106 | | 2,920,000 | |
| 112 | | | 3,100,000 |
| 135 | 7,200,000 | | |
| 155 | | 4,100,000 | |
| 159 | | | 5,210,000 |
| 178 | 7,450,000 | | |
| 209 | | | 5,600,000 |
| 221 | 6,650,000 | | |
| 254 | 555,000 | | |
| 257.1 | | 4,430,000 | |
| 260 | | | 2,240,000 |
| 288 | 77,900 | | |
| 297 | | 222,000 | |
| 300 | | | 168,000 |
| 330 | | 77,900 | |
| 342 | | | 67,300 |

From the foregoing description it will be seen that this invention greatly enhances the utility of ion-exchange processes, in extending their productivity and efficacy where water of the highest attainable purity is demanded.

Although the invention has been described in detail with reference to preferred embodiments, it is contemplated that modifications will occur to those skilled in the art, and that such modifications may be made without departing from the scope of the invention.

Having thus disclosed my invention and described in detail its preferred embodiment, I claim and desire to secure by Letters Patent:

1. The method of treating natural water to remove dissolved impurities and to increase its resistivity comprising passing the water in contact with a weakly basic porous acid adsorbing resin, a cation-exchange resin in the hydrogen form and a strongly basic anion-exchange resin in the hydroxyl form, the cation and anion-exchange resins being in substantially stoichiometrically equivalent quantities, and the acid adsorbing resin being in an amount of from $1/10$ to $1/2$ the weight of the anion-exchange resin.

2. The method defined by claim 1 wherein the resins are in intimate admixture forming a single bed through which the water is percolated.

3. The method of treating natural water to remove dissolved impurities and to increase its resistivity comprising in cyclical operation passing the water through a bed comprising a mixture of a weakly basic porous acid adsorbing resin, a cation-exchange resin in the hydrogen form and a strongly basic anion-exchange resin in the hydroxyl form, the anion and cation resins being present in substantially stoichiometrically equivalent amounts and the acid adsorbing resin being present in an amount of between about $1/10$ and $1/2$ the weight of the anion-exchange resin, then interrupting the flow of water and regenerating the resins by separating the mixture into two lots, one lot comprising the cation-exchange resin and the other lot comprising a mixture of the anion-exchange resin and the acid adsorbing resin, passing an aqueous acid regenerant solution in contact with the cation-exchange resin, passing an aqueous basic regenerant solution in contact with the mixture of resins, rinsing the resins to remove excess regenerant solution, and mixing all the resins together to reform the bed for continued operation.

4. The method of treating natural water to remove dissolved impurities and to increase its resistivity comprising passing the water in contact with a weakly basic porous acid adsorbing resin, a cation exchange resin in the hydrogen form and a strongly basic anion-exchange resin in the hydroxyl form, the cation and anion exchange resins being in substantially stoichiometrically equivalent quantities, and the acid adsorbing resin being in an amount of at least about 1/10 the weight of the anion exchange resin.

5. The method of of treating natural water to remove dissolved impurities and to increase its resistivity comprising in cyclical operation passing the water through a bed comprising a mixture of a weakly basic porous acid adsorbing resin, a cation-exchange resin in the hydrogen form and a strongly basic anion-exchange resin in the hydroxyl form, the anion and cation resins being present in substantially stoichiometrically equivalent amounts and the acid adsorbing resin being present in an amount of at least about 1/10 the weight of the anion exchange resin, then interrupting the flow of water and regenerating the resins by separating the mixture into two lots, one lot comprising the cation-exchange resin and the other lot comprising a mixture of the anion-exchange resin and the acid adsorbing resin, passing an aqueous acid regenerant solution in contact with the cation-exchange resin, passing an aqueous basic regenerant solution in contact with the mixture of anion and acid adsorbing resin, rinsing the resins to remove excess regenerant solution, and mixing all the resins together to reform the bed for continued operation.

6. In the process of demineralizing natural water which includes passing said water in contact with a strongly acid cation-exchange resin and a strongly basic anion-exchange resin which are in relative amounts sufficient to remove substantially all of the dissolved electrolyte from said water and to provide substantially pure water, the improvement which comprises passing said water in contact with an additional amount of a weakly basic porous acid adsorbing resin such that the resistivity of the water is raised above that of said substantially pure water.

References Cited in the file of this patent

UNITED STATES PATENTS

| | | |
|---|---|---|
| 2,470,500 | Lawrence | May 17, 1949 |
| 2,632,001 | McMaster et al. | Mar. 17, 1953 |
| 2,666,741 | McMullen | Jan. 19, 1954 |
| 2,692,244 | Kunin et al. | Oct. 19, 1954 |

OTHER REFERENCES

Ind. and Eng. Chem., "Preferential Adsorption," vol. 35, No. 8, August 1943 (pages 859–863).

Ind. and Eng. Chem., "Mixed-Bed Deionization," vol. 43, No. 3, March 1951 (pages 730–734).

"Synthetic Ion-Exchangers," G. H. Osborn, pages 23–25, Chapman and Hall (1955), London.

Ind. and Eng. Chem., "Monobed Deionization with Ion Exchange Resins," vol. 43, No. 3, pages 738–9, March 1951.

Kunin & Myers: "Ion Exchange Resins," John Wiley & Sons Inc., N.Y., 1950, pages 96 and 97.